United States Patent
Zipor et al.

(10) Patent No.: US 8,381,263 B1
(45) Date of Patent: Feb. 19, 2013

(54) SYSTEM, METHOD, AND COMPUTER PROGRAM FOR ALLOWING A NON-CHARGEABLE EVENT BASED ON AN AUTHORIZATION THEREOF

(75) Inventors: Dalia Zipor, Overland Park, KS (US); Adi Lachman, Raanana (IL); Ofer Levi, Overland Park (IL); Ilan Buganim, Yehud (IL); Felix Margulis, Rishon Le Zion (IL)

(73) Assignee: Amdocs Software Systems Limited, Dublin (IE)

( * ) Notice: Subject to any disclaimer, the term of this patent is extended or adjusted under 35 U.S.C. 154(b) by 830 days.

(21) Appl. No.: 12/140,786

(22) Filed: Jun. 17, 2008

(51) Int. Cl.
*H04L 29/06* (2006.01)
(52) U.S. Cl. .......................................................... 726/3
(58) Field of Classification Search .................. None
See application file for complete search history.

(56) References Cited

U.S. PATENT DOCUMENTS

| 5,631,947 | A | | 5/1997 | Wittstein et al. ................. 379/59 |
| 5,966,649 | A | * | 10/1999 | Gulliford et al. .............. 455/408 |
| 6,157,823 | A | | 12/2000 | Fougnies et al. .............. 455/406 |
| 6,393,269 | B1 | * | 5/2002 | Hartmaier et al. ............. 455/406 |
| 2004/0097220 | A1 | * | 5/2004 | McGregor et al. ............. 455/419 |

* cited by examiner

*Primary Examiner* — Hadi Armouche
*Assistant Examiner* — Simon Kanaan
(74) *Attorney, Agent, or Firm* — Zilka-Kotab, PC

(57) ABSTRACT

A system, method, and computer program product are provided for allowing a non-chargeable event based on an authorization thereof. In use, an instruction to authorize events is received from an event threshold module based on a determination that an event threshold has been met. Additionally, in response to the instruction, a request is sent to an event processor to authorize an event, where the authorization is based on a determination of whether the event is chargeable or non-chargeable. Further, the event is allowed if the event is authorized by the event processor.

21 Claims, 6 Drawing Sheets

SYSTEM, METHOD, AND COMPUTER PROGRAM FOR ALLOWING A NON-CHARGEABLE EVENT BASED ON AN AUTHORIZATION THEREOF

FIELD OF THE INVENTION

The present invention relates to processing events, and more particularly to processing non-chargeable events.

BACKGROUND

Event processing systems have traditionally processed an event, such as a service event, according to a chargeable account associated with a customer initiating the event. For example, event processing has generally been allowed in exchange for payment via the chargeable account. However, traditional event processing systems have customarily exhibited various limitations, particularly in processing non-chargeable events. Just by way of example, events have conventionally been processed by a module charging for the events. Thus, once a chargeable account associated with a customer is incapable of being further charged for events (e.g. due to a spending limit being met, etc.), all events including chargeable and non-chargeable events have been prevented from being processed.

There is thus a need for addressing these and/or other issues associated with the prior art.

SUMMARY

A system, method, and computer program product are provided for allowing a non-chargeable event based on an authorization thereof. In use, an instruction to authorize events is received from an event threshold module based on a determination that an event threshold has been met. Additionally, in response to the instruction, a request is sent to an event processor to authorize an event, where the authorization is based on a determination of whether the event is chargeable or non-chargeable. Further, the event is allowed if the event is authorized by the event processor.

DETAILED DESCRIPTION

Figure 1:
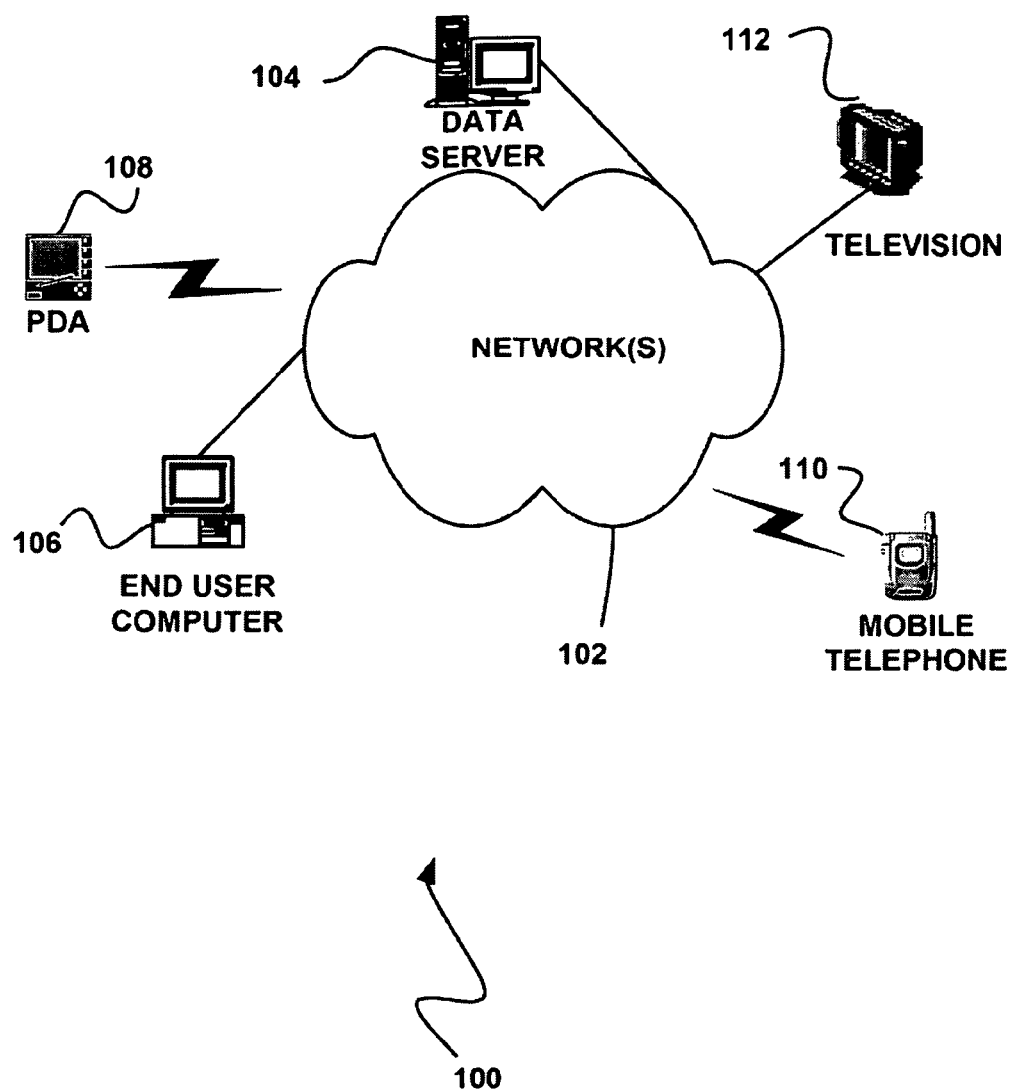
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
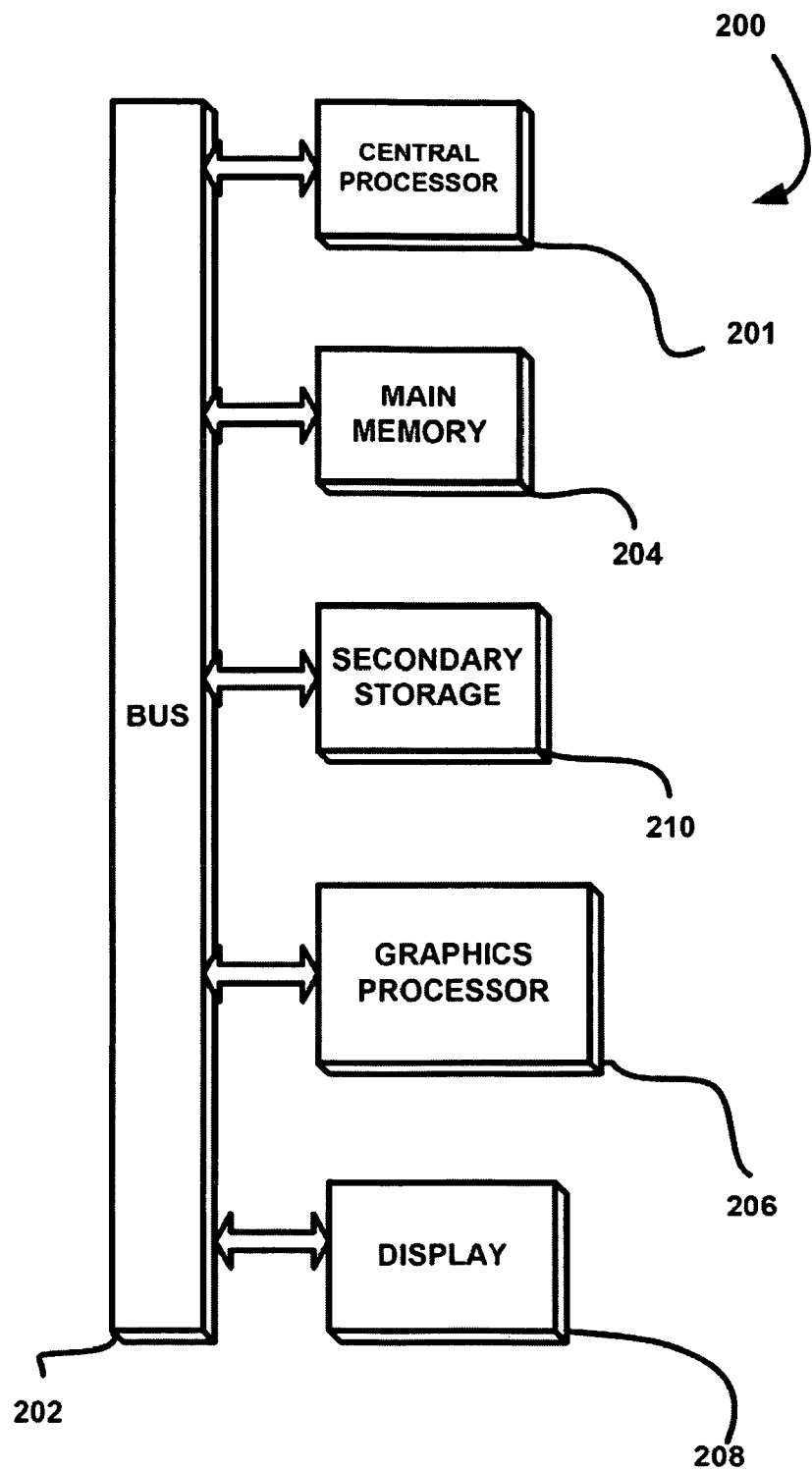
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic rape drive, a compact disk drive, etc. The removable storage drive reads from anti/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
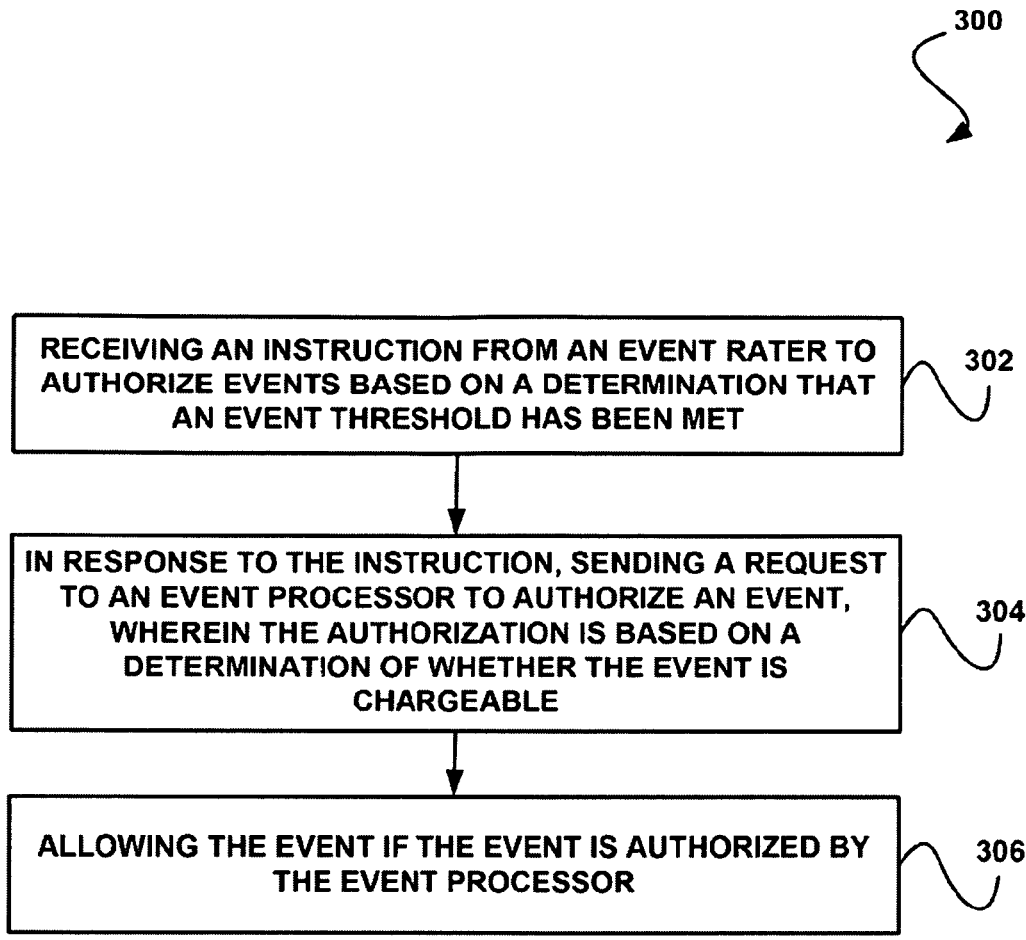
FIG. 3 shows a method for allowing a non-chargeable event based on an authorization thereof, in accordance with one embodiment.

FIG. 3 shows a method 300 for allowing a non-chargeable event based on an authorization thereof, in accordance with one embodiment. As an option, the method 300 may be carried out in the context of the details of FIGS. 1 and/or 2. Of course, however, the method 300 may be carried out in any desired environment.

As shown in operation 302, an instruction to authorize events is received from an event threshold module based on a determination that an event threshold has been met. In the context of the present embodiment, the events may include any events associated with a product and/or service. In one embodiment, the events may provide a service. For example, the service may include a mobile telephone service, a wireless network service, an electronic messaging service, a content downloading service, a data service, etc.

Additionally, the instruction to authorize the events may include an instruction to authorize events initiated by a customer, based on chargeability rules (e.g. whether the events are chargeable or non-chargeable). For example, the instruction to authorize the events may include an instruction to only allow events that are authorized, in one embodiment. As an option, the instruction may be received in response to a determination by the event rater that the event threshold has been met. Thus, once the event threshold has been met, events may optionally be required to be authorized prior to being allowed. As an option, the instruction may be received by a service provider utilized for processing (e.g. allowing, preventing, etc. the events), such that the service provider is optionally required to authorize the events prior to allowing such events.

The event threshold module from which the instruction is received may include any module (e.g. external module) capable of determining whether the event threshold has been met. In addition, the event threshold module may determine whether an authorization flag is to be set to indicate that authorization of the event is required, based on the determination of whether the even threshold has been met. In one embodiment, an event rater may be utilized for rating events (e.g. using predetermined rating schemes, a subscriber's agreement, a subscriber's profile, event attributes, etc.). As an option, an off-line chargeable account (e.g. debit account, etc.) may be charged for the events based on the event ratings determined by the event rater.

The determination of whether the authorization is required may include a limit on the chargeable account, subscriber's agreement, subscriber's profile, or global criteria such as the event type, for example. Thus, the event threshold module may optionally determine that authorization is required if the limit on the chargeable account, etc. has been met. For example, the limit on the chargeable account may be met if the chargeable account has been charged to the limit for events. As another example, the limit on the chargeable account may be met if a balance of the chargeable account is below a predetermined amount, is zero, etc. Of course, it should be noted that the event threshold may include any threshold associated with events.

Just by way of example, the chargeable account may be associated with a customer (e.g. of a service provider providing a service via the events, etc.). To this end, for each event initiated by the customer, the chargeable account may be charged according to a rating for the event. When a limit of the chargeable account is met, an instruction to authorize events initiated by the customer may be received, such that any subsequent events initiated by the customer may be required to be authorized prior to being allowed.

In addition, as shown in operation 304, a request to authorize an event is sent to an event processor, where the authorization is based on a determination of whether the event is chargeable or non-chargeable. In one embodiment, the event may include an event initiated subsequent to the receipt of the instruction to authorize events. In another embodiment, the event may be initiated by the customer for whom the event threshold has been met. Accordingly, events initiated by a customer subsequent to a determination that an event threshold associated with the customer has been met may be requested to be authorized.

Requesting the event to be authorized may include requesting an indication of whether the event is authorized, as an option. Thus, a request may be sent to the event processor for requesting the indication of whether the event is authorized. To this end, the event processor may include any module capable of authorizing events based on a determination of whether each of such events is meeting chargeable rules.

The event may be chargeable if a charge, such as a predetermined fee, is associated with allowing the event, in the context of the present description. For example, the event may be chargeable if the customer that initiated the event is billed for the event (e.g. by the service provider, etc.). Moreover, the event may be non-chargeable if allowing the event is free of charge (e.g. as predetermined by the service provider, etc.).

For example, the event processor may apply at least one predetermined chargeability rule to the event for determining whether the event is chargeable. The predetermined chargeability rule may identify a particular event predetermined to be chargeable, in one embodiment. Thus, a match between the event and the chargeability rule may indicate that the event is chargeable. With respect to such embodiment, if the event and the chargeability rule do not match, the event may optionally be automatically determined to be non-chargeable.

As another option, the predetermined chargeability rule may identify a particular event predetermined to be non-chargeable. Accordingly, a match between the event and the chargeability rule may indicate that the event is non-chargeable. If the event and the chargeability rule do not match, the event may optionally be automatically determined to be chargeable, with respect to such embodiment.

In another embodiment, the predetermined chargeability rule may identify a type (e.g. category, etc.) of event predetermined to be chargeable. Accordingly, a match between a type of the event and the chargeability rule may indicate that the event is chargeable. With respect to such embodiment, if the event and the chargeability rule do not match, the event may optionally be automatically determined to be non-chargeable.

In yet another embodiment, the predetermined chargeability rule may identify a type of event predetermined to be non-chargeable, such that a match between the type of the event and the chargeability rule may indicate that the event is non-chargeable. If the event and the chargeability rule do not match, the event may optionally be automatically determined to be chargeable, with respect to such embodiment. Of course, however, it may be determined whether the event is chargeable in any desired manner.

Further still, if the event is determined to not be chargeable (i.e. be non-chargeable), the event may be authorized by the event processor. In another embodiment, the event may not be authorized if it is determined by the event processor that the event is chargeable. In this way, chargeable events initiated by a customer after the event threshold associated with such customer has been met may optionally not be authorized. However, non-chargeable events initiated by a customer after the event threshold associated with such customer has been met may optionally be authorized.

Moreover, the event is allowed if the event is authorized by the event processor, as shown in operation 306. In the context of the present description, allowing the event may include permitting the event to occur. In one embodiment, the event may be allowed by processing the event.

Just by way of example, if the event includes an electronic message to be transmitted to a designated destination device, allowing the event may include transmitting the electronic message to the destination device. As an option, the event may be allowed by the service provider providing a service (e.g. network service, etc.) via which the event is allowed. To this end, only non-chargeable events initiated after the event threshold has been met may be authorized and thus allowed.

In another optional embodiment, the event may be prevented if the event is not authorized by the event processor (not shown). The event may be prevented by blocking the event, precluding the event from occurring, etc. Accordingly, chargeable events initiated after the event threshold has been met may not be authorized and thus prevented.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
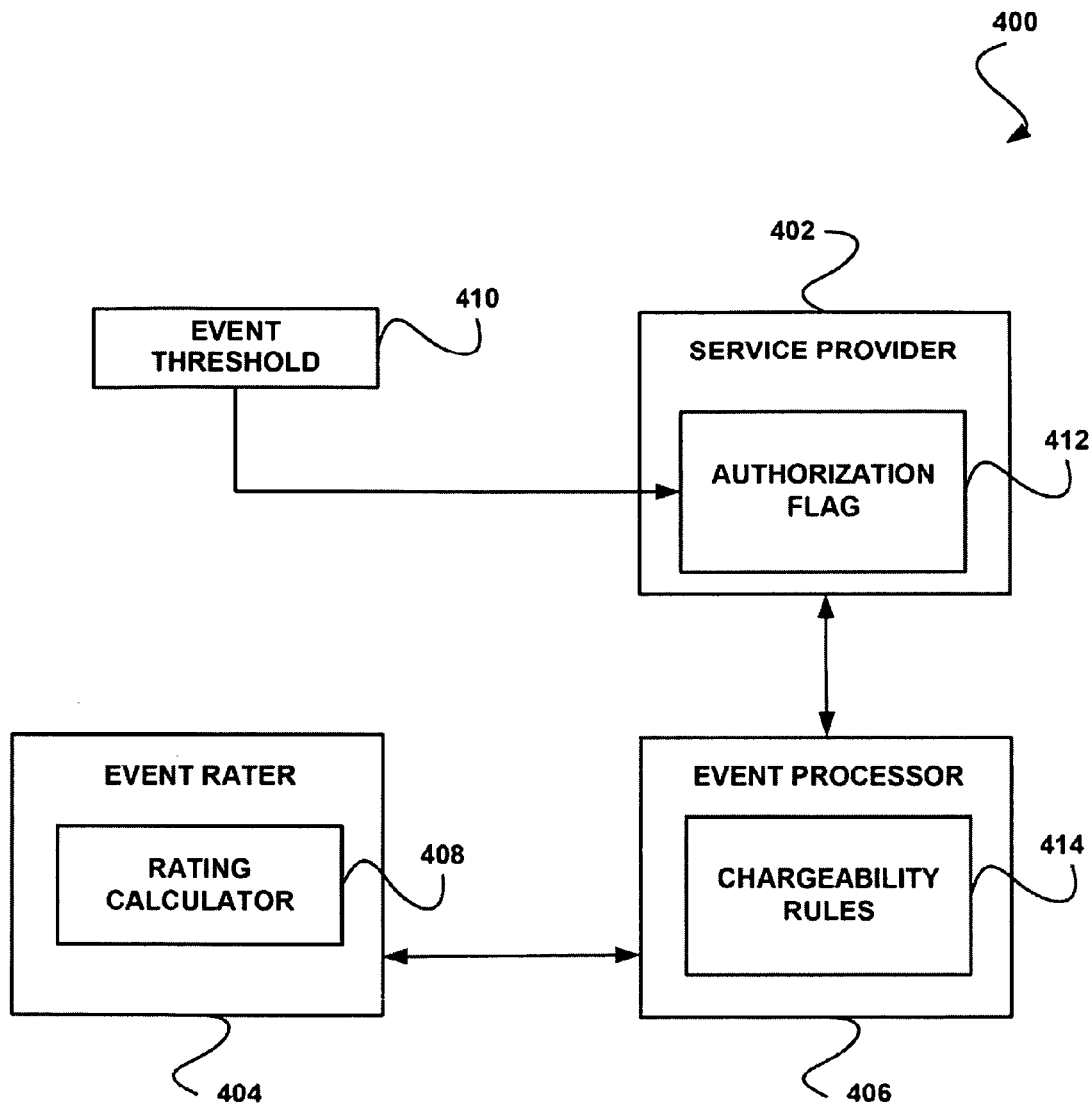
FIG. 4 shows a system for allowing a non-chargeable event based on an authorization thereof, in accordance with another embodiment.

FIG. 4 shows a system 400 for allowing a non-chargeable event based on an authorization thereof, in accordance with another embodiment. As an option, the system 400 may be implemented in the context of the details of FIGS. 1-3. Of course, however, the system 400 may be implemented in any desired environment. Further, the aforementioned definitions may equally apply to the description below.

As shown, a service provider 402 is included in the system 400. The service provider 402 may include any device (e.g. server, etc.) utilized by an entity for providing a service. Just by way of example, the service provider 402 may provide communications between devices, content to devices, etc. over a network. Such network may include any of the networks described above with respect to FIG. 1.

In one embodiment, the service provider 402 may receive a request for an event by a customer (not shown) of the service provider 402. The request for the event may be automatically generated in response to an attempt by the customer to initiate the event. Further, the event may include utilization of the service provided by the service provider 402, in the context of the present embodiment.

In response to receipt of the request for the event, the service provider 402 may determine whether the event is required to be authorized prior to allowing the event. As shown, the service provider 402 may include an authorization flag 412 for indicating whether the event requires authorization. The authorization flag 412 may be specific to the customer attempting the event, as an option, such that the authorization flag 412 may indicate whether events attempted by such customer require authorization. With respect to the present embodiment, the event may require authorization based on a determination that an event threshold has been met.

For example, if the service provider 402 receives a request for an event from a customer and the authorization flag 412 indicates that authorization for the event is not required (e.g. the flag is not set, etc.), the service provider 402 may send a request to the event rater 404 via the event processor 406 requesting the event rater 404 to process the event. As an option, the event rater 404 may be on-line (i.e. real-time). For example, the event rater 404 may be on-line such that functionality thereof may be executed prior to generation, execution, completion, etc. of an event. In one embodiment, the event rater 404 may process the event by calculating a rate for the event. Further, the event rater 404 may utilize a rating calculator 408 to calculate the rate for the event. As an option, the rating calculator 408 may calculate the rate utilizing at least one predefined rating scheme associated with the event and/or the customer.

Applying the rating scheme to the event may indicate that there is no charge for the event, in one embodiment. If the event rater 404 determines that the event is not chargeable, the event rater 404 may respond to the event processor 406 which may apply a chargeability rule 414 to the event (as described below) and respond to the service provider 402 with a message indicating that the event is to be allowed. Accordingly, the service provider 402 may allow the event (e.g. allow the event to occur, etc.).

In another embodiment, applying the rating scheme to the event may indicate a charge for the event. If a charge is determined, the event rater 404 may bill the customer for the event. Additionally, the event rater 404 may apply the charge to an event threshold 410 (e.g. an event threshold module). Such event threshold 410 may be specific to the customer, as an option. As another option, the event threshold 410 may include an off-line (e.g. non-real time) debit account of the customer.

As another option, the event threshold 410 may include a limit on charges capable of being billed to the customer, for example. Thus, in one optional embodiment, charges for events attempted by a customer may be accumulated. As each charge is determined, the resultant accumulated charges may further be compared to the event threshold 410. If, based on the comparison, it is determined that the event threshold 410 is not met, the event threshold 410 may respond to the service provider 402 with a message indicating that the event is to be allowed. To this end, the service provider 402 may allow the event.

Once it is determined, based on the comparison, that the event threshold 410 is met, the event threshold 410 may send an instruction to the service provider 402 that any subsequent events attempted by the customer are to be authorized prior to allowing such events. The instruction may include setting the authorization flag 412 to indicate that events attempted by the customer are to be authorized. In this way, the service provider 402 may determine when an event attempted by a customer is required to be authorized prior to allowing the event. Optionally, the event threshold 410 may also send an instruction to the service provider 402 indicating that any subsequent events attempted by the customer are to be automatically blocked. Such instruction may be sent based on any desired criteria.

As another option, the event threshold 410 may determine that the event threshold 410 is no longer met. If the event threshold 410 determines that the event threshold 410 is no longer met, the event threshold 410 may send an instruction to the service provider 402 that any subsequent events attempted by the customer are not to be authorized prior to allowing such events. Such instruction may include changing the authorization flag 412 to indicate that events attempted by the customer are not to be authorized.

If, in response to receipt of a request for an event from the customer, the service provider 402 determines that the event is required to be authorized (e.g. based on the authorization flag 412), the service provider 402 requests an event processor 406 to authorize the event. To this end, the service provider 402 may be in communication with the event processor 406 (e.g. over a network, etc.) for requesting such event authorizations. In one embodiment, the event processor 406 may be on-line. In another embodiment, the service provider 402 may request real-time event authorization by the event processor 406.

In response to receipt of the request for the authorization of the event, the event processor 406 may apply at least one chargeability rule 414 to the event. The chargeability rule 414 may be specific to the customer that attempted the event, as an option. Thus, the event processor 406 may include a plurality of chargeability rules 414, each chargeability rule 414 associated with at least one customer.

With respect to the present embodiment, the chargeability rule 414 may indicate whether the event is chargeable. In this way, chargeability rules 414 associated with each customer may indicate a chargeability of events capable of being attempted by such customer. As an option, the chargeability rules 414 may be dynamically adjusted by the event processor 406.

For example, if the event rater 404 modifies a chargeability of an event, the event rater 404 may notify the event processor 406 of the modification, such that the event processor 406 may dynamically adjust the chargeability rules 414 to reflect the modification. Just by way of example, the event rater 404 may modify a chargeability of an event (e.g. from being non-chargeable to chargeable, etc.) in response to a predefined usage threshold of a service associated with the event (e.g. a threshold number of text messages, a threshold amount of time of network usage, etc.) being met.

If it is determined by the event processor 406 that the event attempted by the customer is not chargeable, the event processor 406 sends a message to the service provider 402 indicating that the event is authorized. In response to receipt of such authorization message, the service provider 402 allows the event. Furthermore, the service provider 402 may send an indication of the allowance of the event to the event rater 404, as an option. In this way, the event rater 404 may update service usage, etc. (e.g. with respect to events, duration, kilobits, etc.) allowed for the customer based on the event, in an off-line (e.g. non-real time) manner.

If it is determined by the event processor 406 that the event attempted by the customer is chargeable, the event processor 406 sends a message to the service provider 402 indicating that the event is not authorized. In response to receipt of the message indicating that the event is not authorized, the service provider 402 prevents the event. Accordingly, the service provider 402 may conditionally allow events based on an authorization thereof, without necessarily requiring the events to be rated, as an option.

It should be noted that the chargeability rules 414 may be determined and the authorization flag 412 may be set prior to completion of an event initiated by a customer. In this way, the chargeability rules 414 and the authorization flag 412 may be prevented from causing errors with respect to the event. Additionally, if the event threshold 410 is included in a debit account of the customer, such debit account may be off-line such that it is prevented from being impacted in real time by the chargeability rules 414 and/or the authorization flag.

Figure 5:
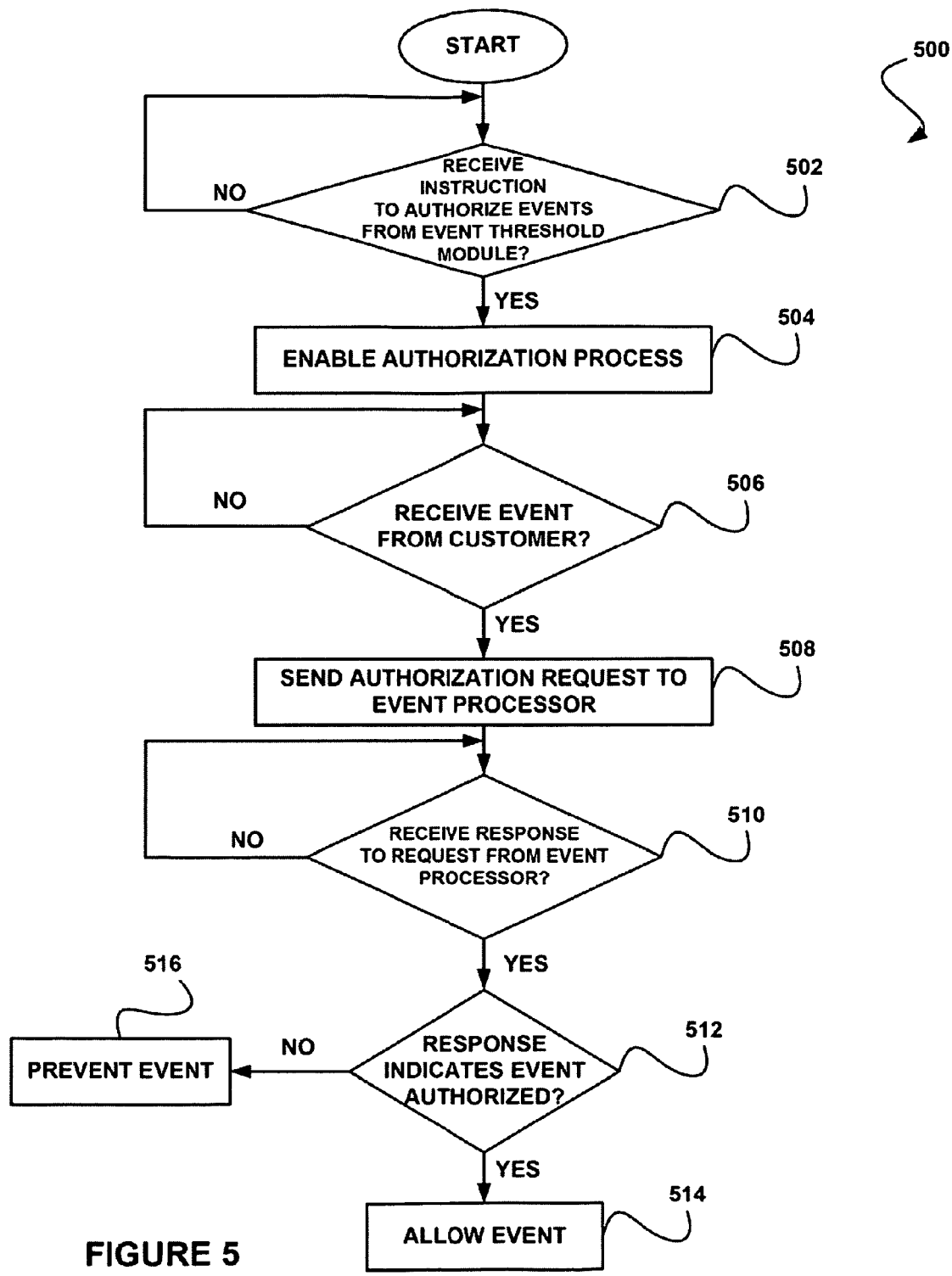
FIG. 5 shows a method for enabling an authorization process to conditionally allow a non-chargeable event based on an authorization thereof, in accordance with yet another embodiment.

FIG. 5 shows a method 500 for enabling an authorization process to conditionally allow a non-chargeable event based on an authorization thereof, in accordance with yet another embodiment. As an option, the method 500 may be carried out in the context of the details of FIGS. 1-4. For example, the method 500 may be implemented utilizing the service provider 402 of FIG. 4. Of course, however, the method 500 may be carried out in any desired environment. Again, the aforementioned definitions may equally apply to the description below.

As shown in decision 502, it is determined whether an instruction to authorize events is received from an event threshold module. The event threshold module may include the event threshold 410 of FIG. 4, for example. Additionally, with respect to the present embodiment, the instruction to authorize events may be received based on a determination that an event threshold has been met.

If it is determined that an instruction to authorize events is not received from the event threshold module, the method 500 continues to wait for such an instruction. Prior to receipt of the instruction, events attempted by a customer associated with the event threshold may be processed (e.g. rated, etc.) by an event rater, as an option. Once the event threshold module determines that the event threshold has been met, the event threshold module may send the instruction to authorize events.

Once it is determined that an instruction to authorize events is received from the event threshold, module, an authorization process is enabled. Note operation 504. The authorization process may include requesting that any events attempted by the customer be authorized, in one embodiment. The authorization process may be enabled by setting an authorization flag indicating events attempted while the flag is set are to be authorized. Of course, however, the authorization process may be enabled in any manner.

Further, as shown in decision 506, it is determined whether an event is received from the customer. With respect to the present embodiment, receiving an event from the customer may include receiving a request for an event from the customer. Such request may be received in response to an attempt of the event by the customer.

If it is determined that an event is not received from the customer, the method 500 continues to wait for such an event. If, however, it is determined that an event is received from the customer, an authorization request is sent to an event processor. Note operation 508. The event processor may include the event processor 406 of FIG. 4, for example. In addition, the authorization request may request the event processor 406 to authorize the event.

Still yet, it is determined whether a response to the authorization request is received from the event processor, as shown in operation 510. The response may include any message from the event processor indicating whether the event is authorized. If it is determined that a response has not been received, the method 500 continues to wait for the response, optionally until the method 500 times-out based on a default.

If it is determined that a response has been received, it is further determined whether the response indicates that the event is authorized. Note decision 512. If the response indicates that that the event is authorized, the event is allowed, as shown in operation 514. If, however, the event response indicates that that the event is not authorized, the event is prevented, as shown in operation 516.

Figure 6:
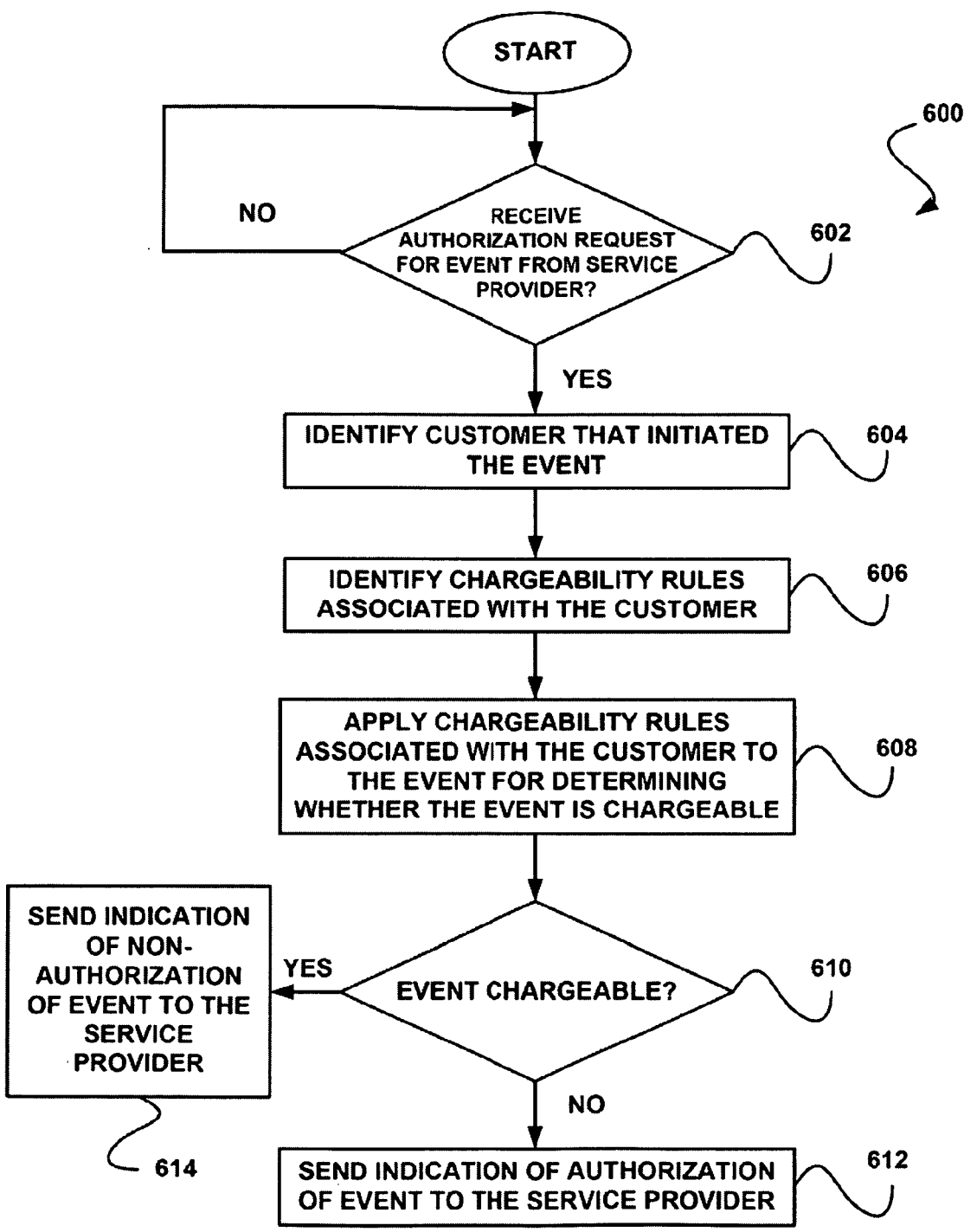
FIG. 6 shows a method for determining whether an event is an authorized non-chargeable event, in accordance with still yet another embodiment.

FIG. 6 shows a method 600 for determining whether an event is an authorized non-chargeable event, in accordance with still yet another embodiment. As an option, the method 600 may be carried out in the context of the details of FIGS. 1-5. For example, the method 600 may be carried out utilizing the event processor 406 of FIG. 4. Of course, however, the method 600 may be carried out in any desired environment. Yet again, the aforementioned definitions may equally apply to the description below.

As shown in decision 602, it is determined whether an authorization request for an event is received from a service provider. The authorization request may include any request for the event to be authorized. As an option, the service provider may include the service provider 402 of FIG. 2.

If it is determined that an authorization request for an event has not been received from the service provider, the method 600 continues to wait for such an authorization request. If, however, it is determined that an authorization request for an event has been received from the service provider, a customer that initiated the event is identified. Note operation 604. The customer may be identified in any desired manner. In one embodiment, the customer may be identified via a customer identified included in the authorization request for the event received from the service provider.

Furthermore, chargeability rules associated with the customer are identified, as shown in operation 606. In one embodiment, the chargeability rules may be stored in a data structure (e.g. database, table, etc.). In another embodiment, the customer identified may be utilized for looking up the chargeability rules associated therewith. In this way, chargeability rules specific to the customer attempting the event may optionally be identified.

Still yet, the chargeability rules associated with the customer are applied to the event for determining whether the event is chargeable. Note operation 608. For example, the chargeability rules may indicate predetermined types of events associated with the customer (e.g. capable of being attempted by the customer) that are chargeable, non-chargeable, etc. In one embodiment, the chargeability rules may be applied to the event by comparing criteria included therein (e.g. a type of event indicated thereby) with the event.

Moreover, as shown in decision 610, it is determined whether the event is chargeable. Such determination may be made based on the identified customer (operation 604), the identified chargeability rules (operation 606), and the resultant application of the chargeability rules to the event (in operation 608). In one embodiment, if criterion included in a chargeability rule indicating an associated event is chargeable matches the event, the event may be determined to be chargeable. In another embodiment, if criterion included in a chargeability rule indicating an associated event is non-chargeable matches the event, the event may be determined to be non-chargeable.

If the event is determined to be non-chargeable, an indication of authorization of the event is sent to the service provider. If, however, it is determined that the event is chargeable, an indication of non-authorization of the event is sent to the service provider. In this way, a service provider may be informed of whether an attempted event is authorized in response to a request from such service provider for an authorization of the request.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for receiving at a service provider an instruction from an event threshold module to authorize events based on a determination that an event threshold has been met, wherein the event threshold includes a limit on a chargeable account associated with a particular customer, where the limit on the chargeable account associated with the particular customer is met when a balance of the chargeable account of the customer is below a predetermined amount;
   computer code for sending a request from the service provider to an event processor to authorize an event in response to the service provider receiving the instruction and in response to the service provider receiving a request for the event that is generated in response to an attempt by a customer to initiate the event; and
   computer code for allowing the event if the event is authorized by the event processor;
   wherein the authorization is based on a determination by the event processor of whether the event is non-chargeable or chargeable made using at least one chargeability rule associated with the particular customer;
   wherein the at least one chargeability rule is one of a plurality of different chargeability rules stored in a data structure and specific to a plurality of different customers, such that a first chargeability rule is associated with a first customer and is utilized when the event authorization is performed in connection with events of the first customer, a second chargeability rule is associated with a second customer and is utilized when the event authorization is performed in connection with events of the second customer, and a third chargeability rule is associated with a third customer and is utilized when the event authorization is performed in connection with events of the third customer;
   wherein determining whether the event is non-chargeable includes determining whether a category of the event has been predetermined to be chargeable;
   wherein the limit on the chargeable account associated with the particular customer is met when the balance of the chargeable account of the customer is zero.

2. The computer program product of claim 1, wherein the events provide a service.

3. The computer program product of claim 2, wherein the service includes at least one of a mobile telephone service, a wireless network service, an electronic messaging service, a content downloading service, and a data service.

4. The computer program product of claim 1, wherein the chargeable account includes a debit account.

5. The computer program product of claim 1, wherein the instruction is received by a service provider utilized for processing the events.

6. The computer program product of claim 1, wherein the event rater is on-line.

7. The computer program product of claim 1, wherein determining whether the event is chargeable includes determining whether the event has been predetermined to be chargeable.

8. The computer program product of claim 1, wherein determining whether the event is chargeable includes identifying the particular customer that attempted the event.

9. The computer program product of claim 8, wherein determining whether the event is non-chargeable further includes applying the at least one chargeability rule associated with the particular customer to the event.

10. The computer program product of claim 9, wherein the at least one chargeability rule indicates a predetermined type of event associated with the particular customer that is chargeable.

11. The computer program product of claim 1, wherein the event is authorized if it is determined that the event is non-chargeable.

12. The computer program product of claim 1, wherein the event is not authorized if it is determined that the event is chargeable.

13. The computer program product of claim 1, wherein the event processor is on-line.

14. The computer program product of claim 1, wherein the at least one chargeability rule identifies a particular event predetermined to be chargeable, such that a match between the event and the chargeability rule indicates that the event is chargeable and further such that, if the event and the chargeability rule do not match, the event is automatically determined to be non-chargeable.

15. The computer program product of claim 1, wherein the at least one chargeability rule is dynamically modified in response to a predefined usage threshold of a service associated with the event being net by the particular customer.

16. The computer program product of claim 15, wherein the dynamic modification of the at least one chargeability rule includes modifying the chargeability of the event from a non-chargeable event to a chargeable event.

17. The computer program product of claim 1, wherein the computer program product is operable such that if the event processor determines that the event is chargeable, the event processor sends a message to the service provider indicating that the event is not authorized, and the service provider prevents the event.

18. The computer program product of claim 1, wherein the computer program product is operable such that if the event processor determines that the event is not chargeable, the event processor sends a message to the service provider indicating that the event is authorized, and the service provider allows the event.

19. A method, comprising:

receiving at a service provider an instruction from an event threshold module to authorize events based on a determination that an event threshold has been met, wherein the event threshold includes a limit on a chargeable account associated with a particular customer, where the limit on the chargeable account associated with the particular customer is met when a balance of the chargeable account of the customer is below a predetermined amount;

in response to the service provider receiving the instruction and in response to the service provider receiving a request for the event that is generated in response to an attempt by a customer to initiate the event, sending a request from the service provider to an event processor to authorize an event; and allowing the event if the event is authorized by the event processor;

wherein the authorization is based on a determination by the event processor of whether the event is non-chargeable or chargeable made using at least one chargeability rule associated with the particular customer;

wherein the at least one chargeability rule is one of a plurality of different chargeability rules stored in a data structure and specific to a plurality of different customers, such that a first chargeability rule is associated with a first customer and is utilized when the event authorization is performed in connection with events of the first customer, a second chargeability rule is associated with a second customer and is utilized when the event authorization is performed in connection with events of the second customer, and a third chargeability rule is associated with a third customer and is utilized when the event authorization is performed in connection with events of the third customer;

wherein determining whether the event is non-chargeable includes determining whether a category of the event has been predetermined to be chargeable;

wherein the limit on the chargeable account associated with the particular customer is met when the balance of the chargeable account of the customer is zero.

20. A system, comprising:
a hardware processor for:

receiving at a service provider an instruction from an event threshold module to authorize events based on a determination that an event threshold has been met, wherein the event threshold includes a limit on a chargeable account associated with a particular customer, where the limit on the chargeable account associated with the particular customer is met when a balance of the chargeable account of the customer is below a predetermined amount;

sending a request from the service provider to an event processor to authorize an event in response to the service provider receiving the instruction and in response to the service provider receiving a request for the event that is generated in response to an attempt by a customer to initiate the event; and allowing the event if the event is authorized by the event processor;

wherein the authorization is based on a determination by the event processor of whether the event is non-chargeable or chargeable made using at least one chargeability rule associated with the particular customer;

wherein the at least one chargeability rule is one of a plurality of different chargeability rules stored in a data structure and specific to a plurality of different customers, such that a first chargeability rule is associated with a first customer and is utilized when the event authorization is performed in connection with events of the first customer, a second chargeability rule is associated with a second customer and is utilized when the event authorization is performed in connection with events of the second customer, and a third chargeability rule is associated with a third customer and is utilized when the event authorization is performed in connection with events of the third customer;

wherein determining whether the event is non-chargeable includes determining whether a category of the event has been predetermined to be chargeable;

wherein the limit on the chargeable account associated with the particular customer is met when the balance of the chargeable account of the customer is zero.

21. The system of claim 20, wherein the processor is coupled to memory via a bus.

* * * * *